United States Patent
Kodera et al.

(10) Patent No.: US 10,946,870 B2
(45) Date of Patent: Mar. 16, 2021

(54) VEHICLE CONTROL APPARATUS

(71) Applicant: TOYOTA JIDOSHA KABUSHIKI KAISHA, Toyota (JP)

(72) Inventors: Hiroaki Kodera, Susono (JP); Takahito Endo, Sunto-gun (JP); Kensei Hata, Sunto-gun (JP); Katsuya Iwazaki, Susono (JP); Yushi Seki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 168 days.

(21) Appl. No.: 16/298,048

(22) Filed: Mar. 11, 2019

(65) Prior Publication Data

US 2019/0300015 A1 Oct. 3, 2019

(30) Foreign Application Priority Data

Mar. 28, 2018 (JP) .............................. JP2018-062778

(51) Int. Cl.
*B60W 50/08* (2020.01)
*B60W 50/00* (2006.01)

(52) U.S. Cl.
CPC ...... *B60W 50/085* (2013.01); *B60W 50/0098* (2013.01); *B60W 2050/0089* (2013.01)

(58) Field of Classification Search
CPC .......... B60W 50/085; B60W 50/0098; B60W 2050/0089; B60W 2540/30; B60W 30/18109; B60W 30/18136; B60R 16/037
See application file for complete search history.

(56) References Cited

U.S. PATENT DOCUMENTS

| | | | |
|---|---|---|---|
| 6,198,996 B1 | 3/2001 | Berstis | |
| 10,204,516 B2 | 2/2019 | Sato | |
| 10,507,730 B2* | 12/2019 | Grimes | ................. B60L 3/0046 |
| 2004/0090346 A1* | 5/2004 | Simonds | ............. G08G 1/0962 |
| | | | 340/905 |
| 2004/0092253 A1* | 5/2004 | Simonds | ............. B60R 16/0315 |
| | | | 455/414.2 |
| 2014/0225749 A1* | 8/2014 | Saka | ........................ G08G 1/09 |
| | | | 340/905 |

(Continued)

FOREIGN PATENT DOCUMENTS

| | | |
|---|---|---|
| JP | H11-325234 A | 11/1999 |
| JP | 2000-219092 A | 8/2000 |

(Continued)

*Primary Examiner* — Mussa A Shaawat
(74) *Attorney, Agent, or Firm* — Oliff PLC (57) ABSTRACT

A vehicle control apparatus includes: an information acquisition unit acquiring feature information indicating a feature regarding vehicle driving of an occupant of a vehicle; and a control unit changing at least one property included in a driving property or a manipulation property in the vehicle. Further, the control unit changes at least one property included in the driving property or the manipulation property of the vehicle, from a basic property of the vehicle to a property reflecting the feature information, based on the feature information, and brings the changed property close to the basic property of the vehicle in accordance with at least one of an integrated value of boarding hours, an integrated value of running distances, and the number of boardings of the vehicle of the occupant.

7 Claims, 7 Drawing Sheets

(56) References Cited

U.S. PATENT DOCUMENTS

| | | | | |
|---|---|---|---|---|
| 2014/0350777 | A1* | 11/2014 | Kawai | G07C 5/0808 |
| | | | | 701/32.3 |
| 2016/0084661 | A1* | 3/2016 | Gautama | G01C 21/365 |
| | | | | 701/400 |
| 2017/0213457 | A1* | 7/2017 | Sato | B60W 30/095 |
| 2018/0356830 | A1* | 12/2018 | Haghighat | B60W 10/04 |
| 2019/0113354 | A1* | 4/2019 | Matsumura | G01C 21/3664 |
| 2019/0186422 | A1* | 6/2019 | Dudar | B60K 15/03504 |
| 2019/0286133 | A1* | 9/2019 | Bielby | G05D 1/0088 |
| 2020/0255026 | A1* | 8/2020 | Katardjiev | G08G 1/096725 |
| 2020/0269809 | A1* | 8/2020 | Sanji | B60R 25/245 |

FOREIGN PATENT DOCUMENTS

| | | |
|---|---|---|
| JP | 2001-182812 A | 7/2001 |
| JP | 2001-188992 A | 7/2001 |
| JP | 6201102 B2 | 9/2017 |

\* cited by examiner

VEHICLE CONTROL APPARATUS

CROSS-REFERENCE TO RELATED APPLICATION(S)

The present application claims priority to and incorporates by reference the entire contents of Japanese Patent Application No. 2018-062778 filed in Japan on Mar. 28, 2018.

BACKGROUND

The present disclosure relates to a vehicle control apparatus.

In the related art, there is disclosed a technology of controlling many properties of a vehicle using an in-vehicle computer (Japanese Laid-open Patent Publication No. 2000-219092). In this technology, a smart card key stores a user preference value data such as performance parameters and ride quality parameters, and the in-vehicle computer adjusts a performance property and a ride quality property of a vehicle using the user preference value data.

In the related-art technology such as Japanese Laid-open Patent Publication No. 2000-219092, the property of the vehicle is adjusted based on individual taste (preference) of a user. Thus, in the long term, original performance that is based on a basic property set at the time of design/manufacturing of the vehicle, such as fuel consumption, cannot be sufficiently exerted in some cases. In addition, in the related-art technology, a case where the user changes a vehicle is not considered. In a case where the user changes a vehicle, the user sometimes feels uncomfortable in differences in manipulation feeling and running properties of a vehicle. Nevertheless, applying individual user taste data that had been used in a certain vehicle to a changed vehicle has not been considered.

SUMMARY

There is a need for providing a vehicle control apparatus that can reduce uncomfortable feeling felt in a case where there is a change in vehicle, and exhibit original performance of the vehicle further more.

According to an embodiment, a vehicle control apparatus includes: an information acquisition unit acquiring feature information indicating a feature regarding vehicle driving of an occupant of a vehicle; and a control unit changing at least one property included in a driving property or a manipulation property in the vehicle. Further, the control unit changes at least one property included in the driving property or the manipulation property of the vehicle, from a basic property of the vehicle to a property reflecting the feature information, based on the feature information, and brings the changed property close to the basic property of the vehicle in accordance with at least one of an integrated value of boarding hours, an integrated value of running distances, and the number of boardings of the vehicle of the occupant.

DETAILED DESCRIPTION

Figure 1:
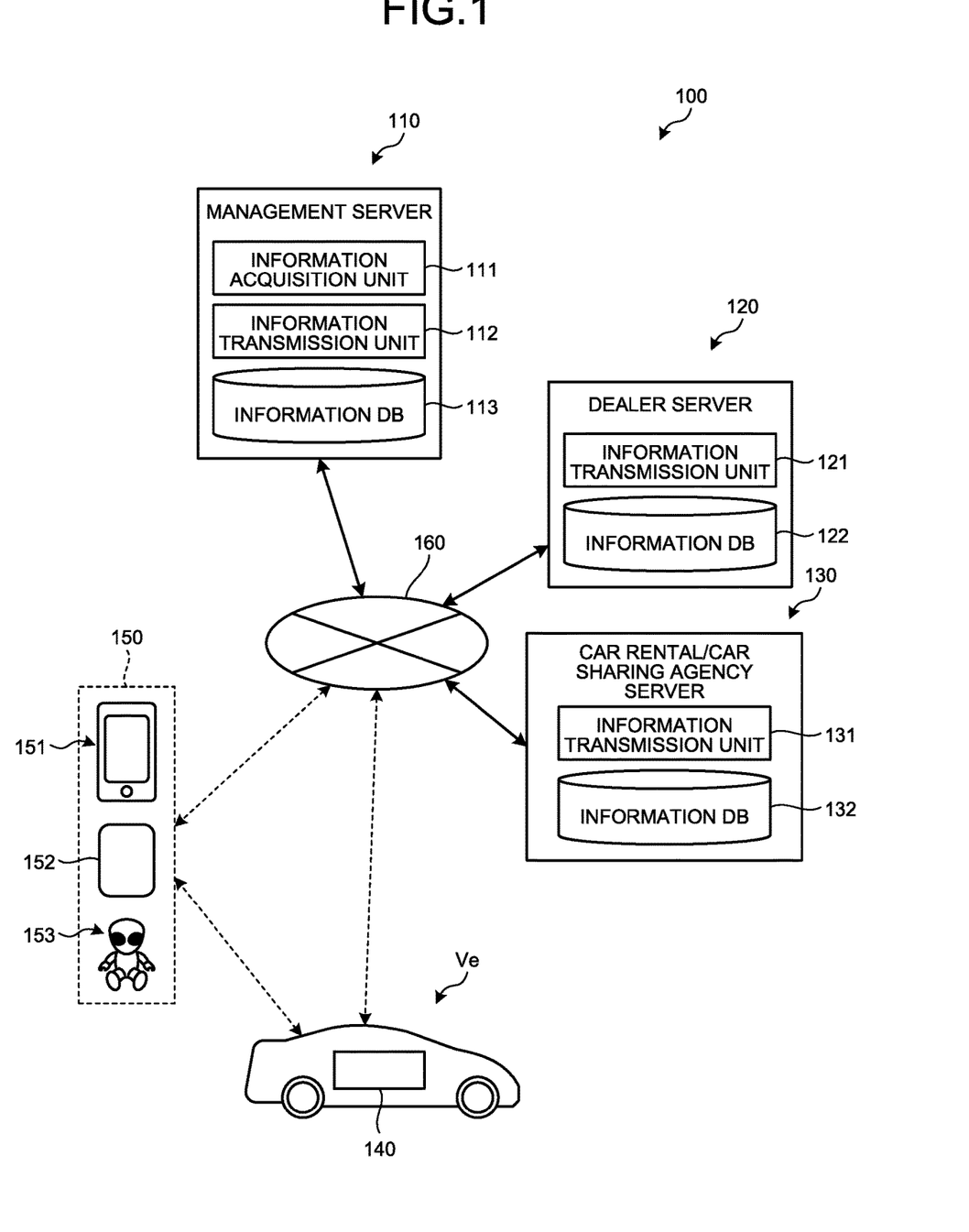
FIG. 1 is a diagram schematically illustrating an example configuration of a vehicle control system including a vehicle control apparatus according to an embodiment.

Hereinafter, a vehicle control apparatus according to an embodiment of the present disclosure will be specifically described with reference to the accompanying drawings. FIG. 1 is a diagram schematically illustrating an example configuration of a vehicle control system including a vehicle control apparatus according to an embodiment. A vehicle control system 100 includes a management server 110, a dealer server 120, a car rental/car sharing agency server 130, an in-vehicle information communication device 140 mounted on a vehicle Ve, and a portable information communication device 150. The management server 110, the dealer server 120, the car rental/car sharing agency server 130, the in-vehicle information communication device 140, and the information communication device 150 can perform information communication with each other via a network 160. In addition, the in-vehicle information communication device 140 and the information communication device 150 can perform radio communication with each other.

Configuration

The management server 110, the dealer server 120, the car rental/car sharing agency server 130, and the in-vehicle information communication device 140 each includes, as hardware, a Central Processing Unit (CPU), a memory, an input device, an output device, a communication device, an external storage device and the like, for example.

As functional units implemented by computer programs using these pieces of hardware, the management server 110 includes an information acquisition unit 111, an information transmission unit 112, and an information database (DB) 113.

The dealer server 120 is a server used by a dealer (seller) of a vehicle. As functional units implemented by computer programs using pieces of hardware, the dealer server 120 includes an information transmission unit 121 and an information database (DB) 122.

The car rental/car sharing agency server 130 is a server used by a car rental agency or a car sharing agency. As functional units implemented by computer programs using pieces of hardware, the car rental/car sharing agency server 130 includes an information transmission unit 131 and an information DB 132.

The portable information communication device 150 is at least one of a portable information communication device 151 such as a smartphone and a tablet, a smart entry device 152, an agent robot 153 such as KIROBO (registered trademark) made by Toyota Motor Corporation and the like, for example. The information communication device 150 has functions such as a function as an electronic key of the vehicle Ve, and an agent function of performing information communication in response to a request of an owner or the like, and performing provision of requested information and execution of a function. In addition, hereinafter, first of all, for simplifying the description, a case will be described as an example where a driver carrying the information communication device 150 boards (rides in) the vehicle Ve alone, or where a plurality of occupants exist but only a driver carries the information communication device 150.

Figure 2:
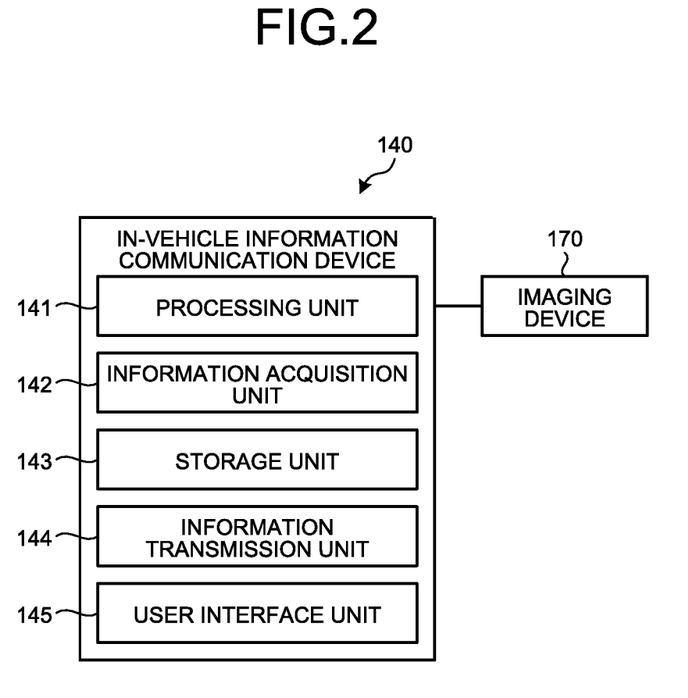
FIG. 2 is a diagram schematically illustrating an example in-vehicle information communication device.

Next, a configuration of the in-vehicle information communication device 140 will be described. FIG. 2 is a diagram schematically illustrating an example configuration of the in-vehicle information communication device 140. As functional units implemented by computer programs using pieces of hardware, the in-vehicle information communication device 140 includes a processing unit 141, an information acquisition unit 142, a storage unit 143, an information transmission unit 144, and a user interface unit 145. In addition, the in-vehicle information communication device 140 is connected to an imaging device 170 that can image the inside of a vehicle compartment of the vehicle Ve. The in-vehicle information communication device 140 includes a car navigation system, for example.

The processing unit 141 performs arithmetic processing for implementing various functions in the in-vehicle information communication device 140. As an information acquisition unit, the information acquisition unit 142 acquires information from the management server 110, the information communication device 150, and the imaging device 170. The storage unit 143 stores an arithmetic processing result of the processing unit 141, information acquired by the information acquisition unit 142 and the like. The information transmission unit 144 transmits information stored by the storage unit 143 to the management server 110 and the information communication device 150. The user interface unit 145 includes a display equipped with a touch panel function that functions as a unit that inputs information and a unit that displays information, a microphone serving as a voice input unit, and a speaker serving as a voice output unit. In addition, the user interface unit 145 may include a display not equipped with a touch panel function and an input button for information input. In addition, the in-vehicle information communication device 140 as well as the information communication device 150 has the agent function.

Figure 3:
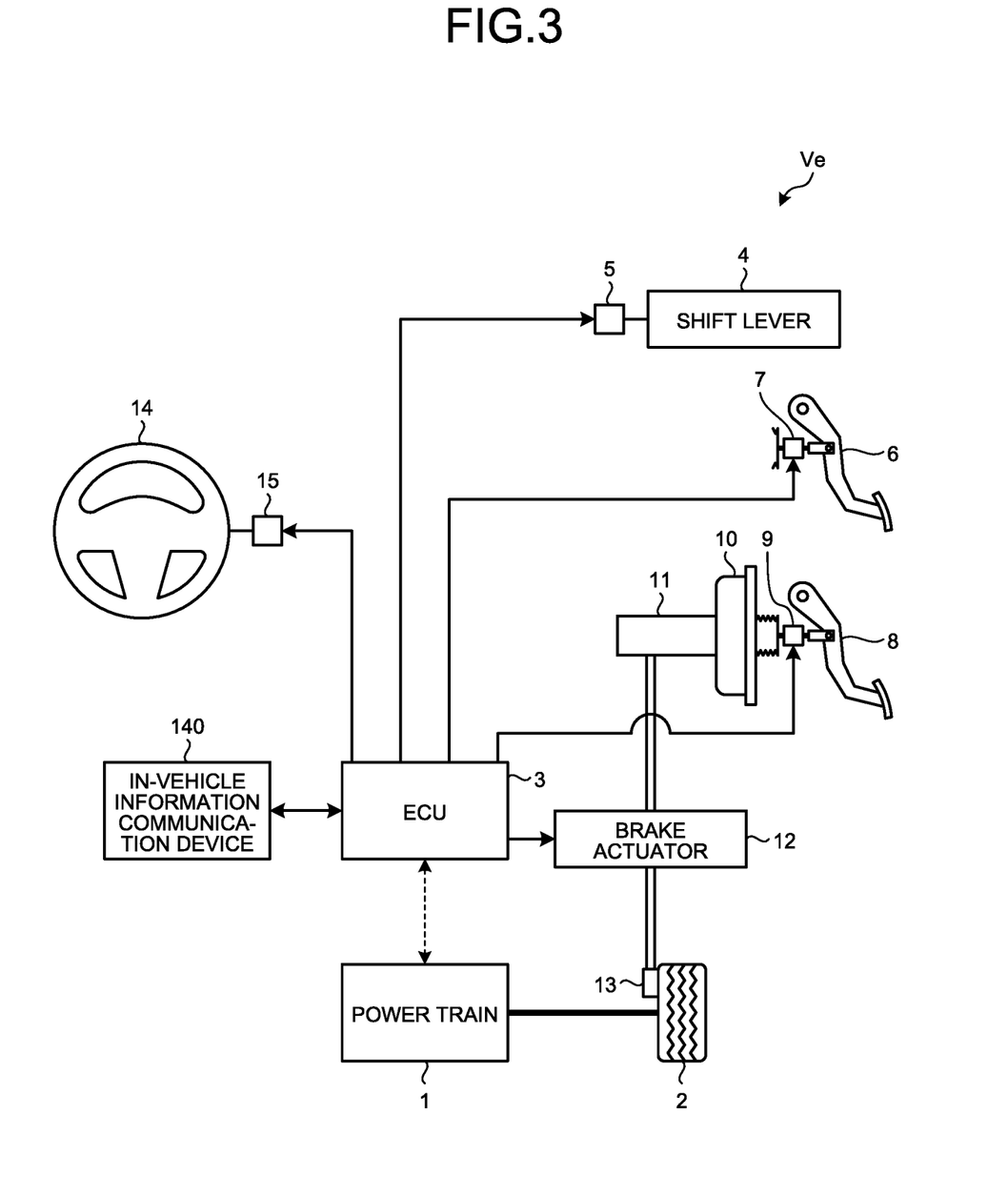
FIG. 3 is a diagram schematically illustrating an example configuration of a power train of a vehicle, and a control mechanism and a manipulation mechanism of the power train.

Next, a configuration of the vehicle Ve will be described. FIG. 3 is a diagram schematically illustrating an example configuration of a power train of the vehicle Ve and a control mechanism and a manipulation mechanism of the power train. In the present embodiment, the vehicle Ve is assumed to be a hybrid vehicle that can drive in a hybrid driving mode and an EV driving mode, and is a vehicle to be newly purchased from a dealer and owned by a driver. As a driving mechanism, the vehicle Ve includes a power train 1 and a drive wheel 2. The power train 1 includes a power source that generates drive force and outputs the generated drive force from an output shaft, and a drive force transmission mechanism that transmits the drive force output by the power source to the drive wheel 2. The power source includes an engine being an internal-combustion and a Motor Generator (MG). A method of hybrid is a series type, a parallel type, or a series parallel type, and is not specifically limited. The drive force transmission mechanism includes a Continuously Variable Transmission. A method of the Continuously Variable Transmission is a belt type or an electric type, and is not specifically limited.

As a control unit, the vehicle Ve includes an Electronic Control Unit (ECU) 3. The ECU 3 mainly includes a microcomputer, and performs calculation using input data, and data and programs that are prestored, and output the calculation result as a control command signal. The ECU 3 outputs, to the engine, a control command signal of a throttle aperture, a fuel injection amount, and an ignition timing of the engine and the like. In addition, the ECU 3 outputs a control command signal to a power control unit (not illustrated) that controls a power running operation and a regeneration operation of the MG, and controls an operation state of the MG. In addition, the ECU 3 outputs a control command signal to the drive force transmission mechanism, and controls an operation state of the drive force transmission mechanism. The ECU 3 can thereby change a driving mode and a driving property of the vehicle Ve. In addition, the ECU 3 is able to mutually communicate with the in-vehicle information communication device 140.

As a manipulation mechanism, the vehicle Ve includes a shift lever 4, an accelerator pedal 6, and reaction force generation devices 5 and 7. The shift lever 4 is a manipulator for selecting a shift range in the power train 1. The format of the shift lever 4 is a floorshift, an instrument panel shift, a paddle shift, a column shift or the like, and is not specifically limited. The accelerator pedal 6 is a manipulator manipulated for obtaining drive force requested by a driver. The reaction force generation device 5 is a device that generates a reaction force in a direction opposite to a manipulation direction of the shift lever 4 of the driver. The reaction force generation device 5 includes an electrical actuator, receives a control command signal from the ECU 3, and generates a commanded reaction force. The ECU 3 generates a control command signal based on information of a shift position of the shift lever 4 that is input from a sensor (not illustrated). The reaction force generation device 7 is a device that generates reaction force in a direction opposite to a pressing direction of the accelerator pedal 6 of the driver. The reaction force generation device 7 includes an electrical actuator, receives a control command signal from the ECU 3, and generates a commanded reaction force. The ECU 3 generates a control command signal based on information of a pressing amount and pressing force of the accelerator pedal 6 that is input from a sensor (not illustrated).

Furthermore, as a manipulation mechanism, the vehicle Ve includes a brake pedal 8, a reaction force generation device 9, a booster 10, a master cylinder 11, a brake actuator 12, and a brake device 13. The brake pedal 8 is a manipulator manipulated for obtaining braking force requested by the driver. The reaction force generation device 9 is a device that generates a reaction force in a direction opposite to a pressing direction of the brake pedal 8 of the driver. The reaction force generation device 9 includes an electrical actuator, receives a control command signal from the ECU 3, and generates a commanded reaction force. The ECU 3 generates a control command signal based on information of a pressing amount and pressing force of the brake pedal 8 that is input from a sensor (not illustrated). The booster 10 doubles the pressing force input to the brake pedal 8. The master cylinder 11 converts the pressing force doubled by the booster 10 into brake fluid pressure. The brake actuator 12 receives a control command signal from the ECU 3, adjusts the brake fluid pressure, and supplies the brake fluid pressure to the brake device 13 provided in each wheel including the drive wheel 2.

Furthermore, as a manipulation mechanism, the vehicle Ve includes a steering wheel 14 and a reaction force generation device 15. The steering wheel 14 is a manipulator for steering a steering wheel of the vehicle Ve. The reaction force generation device 15 is a device that generates a reaction force in a direction opposite to a manipulation direction of the steering wheel 14 of the driver. The reaction force generation device 15 includes an electrical actuator, receives a control command signal from the ECU 3, and generates a commanded reaction force. The ECU 3 generates a control command signal based on information of a steering direction and steering speed of the steering wheel 14 that is input from a sensor (not illustrated).

As described above, by controlling reaction force generated by each of the reaction force generation devices 5, 7, 9, and 15, the ECU 3 can change properties (manipulation properties) of these manipulation mechanisms. The ECU 3 can thereby control manipulation feeling felt when the driver manipulates each of the shift lever 4, the accelerator pedal 6, the brake pedal 8, and the steering wheel 14.

Function of Each Component

Subsequently, functions of the management server 110, the dealer server 120, the car rental/car sharing agency server 130, the in-vehicle information communication device 140, the information communication device 150, the ECU 3, and the like will be described. In addition, the vehicle control apparatus of the embodiment includes the in-vehicle information communication device 140 and the ECU 3.

In the management server 110, the information acquisition unit 111 acquires, via the network 160, feature information indicating a feature regarding vehicle driving of the driver, from the dealer server 120, the car rental/car sharing agency server 130, the in-vehicle information communication device 140, the information communication device 150 and the like. The information DB 113 stores the feature information acquired by the information acquisition unit 111. The information transmission unit 112 transmits, via the network 160, the feature information stored by the information DB 113, to the in-vehicle information communication device 140 and the information communication device 150.

For example, the dealer server 120 stores, as the feature information indicating a feature regarding vehicle driving of the driver, information of the vehicle Ve, information of a vehicle (previously-owned vehicle) that has been owned and driven by the driver before the driver changes to the vehicle Ve, information obtained when the driver has visited a dealer and the like in the information DB 122. The information transmission unit 121 transmits, via the network 160, the feature information stored by the information DB 122 to the management server 110. The previously-owned vehicle is an example of a previously-boarded vehicle that the driver has ever boarded before the time point at which the driver boarded the vehicle Ve. As an example of the information obtained when the driver has visited a dealer, there is information obtained in inspection, part replacement or the like of the previously-owned vehicle. For example, in a case where a question or consultation about fuel consumption of the vehicle Ve, the previously-owned vehicle, or another vehicle is issued from the driver, information indicating that the driver is interested in fuel consumption in vehicle driving is obtained. In addition, in a case where a question or consultation about manipulation feeling (e.g. stroke or weight) of an accelerator pedal or a brake pedal of the vehicle Ve, the previously-owned vehicle, or another vehicle is issued from the driver, information indicating that the driver is interested in manipulation feeling of the accelerator pedal or the brake pedal is obtained. In addition, as the information obtained when the driver has visited for inspection, there is information of a history regarding running, such as a running distance, the number of running times, a running distance per running, and running speed of the vehicle Ve or the previously-owned vehicle, and information of a feature of acceleration and deceleration of the driver. For example, the feature of acceleration and deceleration is a feature indicating whether the driver accelerates up to a point immediately before a stop line, and then, rapidly decelerates, or whether the driver starts to decelerate in a state where a relatively-long distance is left before the stop line, in a case where a traffic signal is a red signal, for example, or a feature regarding a way of using a brake pedal or an engine brake in a downhill. In addition, the information of the feature of acceleration and deceleration can be preferably used in the case of automatic driving, which will be described later. In addition, as another information, for example, there is a use frequency of a paddle shift of the driver. If the use frequency of the paddle shift is high, a feature is estimated to be a feature preferential to manual speed change.

In addition, in a case where the driver requests a purchase quote of a vehicle other than the vehicle Ve, or asks for a catalog, when the driver has visited a dealer, the vehicle is considered to be a vehicle in which the driver is interested, and based on the information, a vehicle type and a body type (compact car, SUV, minivan, sedan, etc.) of a predictively-owned vehicle that the driver is predicted to own in the future can be predicted. The predictively-owned vehicle is an example of a predictively-boarded vehicle predicted to be boarded by an occupant after the occupant exits the vehicle Ve. In addition, information of the predictively-owned vehicle can also be obtained from information of an answer that can predict a vehicle in which the driver is interested, in a questionnaire executed by the dealer and the like. The information of the predictively-owned vehicle is also stored in the information DB 122, and is transmitted to the management server 110 via the network 160.

Furthermore, the information DB 122 stores information of a vehicle preset for the driver for changing a vehicle. For example, due to global environmental problems and the like, a change from a vehicle including only an internal-combustion as a power source to a vehicle with a higher motorized degree has advanced. Regarding the motorized degree, partially-motorized vehicle called mild hybrid or the like is higher than a vehicle including only an internal-combustion as a power source, a full hybrid vehicle is further higher, a plug-in hybrid vehicle is further higher, and an electrical vehicle and a fuel-cell vehicle are the highest.

In addition, for example, as the feature information indicating a feature regarding vehicle driving of the driver, the car rental/car sharing agency server 130 stores, in the information DB 132, information of a vehicle name and a body type of a vehicle rented or shared by the driver (i.e., that the user has ever driven or boarded), and information of a history regarding a history, such as a running distance, the number of running times, a running distance per running, and running speed of a rented or shared vehicle. The information transmission unit 131 transmits, via the network 160, the information stored by the information DB 132 to the management server 110.

In addition, for example, as the feature information indicating a feature regarding vehicle driving of the driver, the in-vehicle information communication device 140 stores, in the storage unit 143, information of a history regarding a history, such as a running distance, the number of running times, a running distance per running, and running speed of the vehicle Ve, information of the feature of acceleration and deceleration of the driver, and information of a use frequency of a paddle shift or the like. The feature information indicating these features regarding vehicle driving can be obtained from the ECU 3, for example. The information transmission unit 144 transmits information stored by the storage unit 143 to the management server 110 and the information communication device 150.

Pieces of information regarding the driver that are stored in the management server 110, the dealer server 120, the car rental/car sharing agency server 130, and the in-vehicle information communication device 140 are managed in association with a user account of the driver.

As described above, the information communication device 150 has functions such as a function as an electronic key of the vehicle Ve and an agent function. In addition, the information communication device 150 appropriately stores, into a storage device or a cloud server, the above-described feature information indicating a feature regarding vehicle driving of the driver. In addition, the information communication device 150 is associated with the user account of the driver. The management server 110, the dealer server 120, the car rental/car sharing agency server 130, the in-vehicle information communication device 140, and the information communication device 150 can thereby cooperate based on the user account, and use the pieces of information regarding the driver.

In addition, internet browsing history information that uses a browser application of the information communication device 150 and the like can also be preferably used. For example, in a case where a specific vehicle name is searched for using a browser application, or a catalog or a quote is asked for online, the internet browsing history information can be information of the predictively-owned vehicle. In addition, in a case where there exists a smart speaker being an agent that cooperates with the information communication device 150 based on the user account of the driver or the like, in a case where a specific vehicle name is looked up using the smart speaker, the information can be information of the predictively-owned vehicle.

Operation Examples of in-Vehicle Information Communication Device 140 and ECU 3

Next, operation examples of the in-vehicle information communication device 140 and the ECU 3 will be described. A driver carrying the information communication device 150 unlocks a door of the vehicle Ve using an electronic key function of the information communication device 150, and boards a driver seat of the vehicle Ve. When the driver presses a start button provided near the driver seat, the in-vehicle information communication device 140, the ECU 3 or the like of the vehicle Ve start up. The in-vehicle information communication device 140 performs communication with the information communication device 150, and confirms a driver based on information of a user account of the information communication device 150.

The in-vehicle information communication device 140 appropriately acquires the feature information indicating a feature regarding vehicle driving of the driver from the management server 110 or the information communication device 150. In the in-vehicle information communication device 140, the processing unit 141 performs arithmetic processing based on the acquired information and generates a command signal, and the generated command signal is transmitted to the ECU 3. Based on the received command signal, the ECU 3 changes at least one property included in driving properties or manipulation properties in the vehicle Ve. Specifically, the ECU 3 performs control of changing at least one property included in driving properties or manipulation properties of the vehicle Ve from a basic property of the vehicle Ve to a property reflecting the feature information. Here, the basic property of the basic property of the vehicle Ve means a property set at the time of design/manufacturing of the vehicle Ve, and is normally set so as to exhibit performance of the vehicle Ve most.

By performing control of changing to the property reflecting feature information in this manner, the driver's uncomfortable feeling in manipulation feeling that is generated in connection with a change to the vehicle Ve can be reduced. For reducing the uncomfortable feeling, it is preferable that the change of the property be performed in the first driving of the owned vehicle Ve, for example.

In addition, in this case, it is preferable that the ECU 3 change at least one property included in driving properties or manipulation properties of the vehicle Ve to a property that reflects the feature information, and be brought close to a property corresponding to a specific previously-boarded vehicle such as a previously-owned vehicle, for example.

The changed property thereby becomes a property accustomed to by an occupant to some extent. Uncomfortable feeling in manipulation feeling that is generated due to a difference from a previously-owned vehicle in driving property or manipulation property of the vehicle Ve when the driver changes from the previously-owned vehicle to the vehicle Ve can be reduced, and a reduction in uncomfortable feeling can be efficiently implemented.

In addition, the specific previously-boarded vehicle is not limited to a previously-boarded vehicle, and a vehicle with the largest integrated value of boarding hours or driving hours of the occupant, the largest integrated value of running distances, or the largest number of boardings or the largest number of driving times may be selected. Such a vehicle is considered to be a vehicle accustomed to by the driver further more. Thus, a reduction in uncomfortable feeling can be implemented more efficiently.

Then, after that, control of bringing the changed property close to a basic property of the vehicle Ve is performed according to at least one of an integrated value of boarding hours (here, driving hours) of the vehicle Ve of the driver, an integrated value of running distances, and the number of boardings (here, the number of driving times). Specifically, the in-vehicle information communication device 140 determines whether to bring the changed property to the basic property of the vehicle Ve according to at least one of the above-described three parameters. In a case where it is determined to bring close, the in-vehicle information communication device 140 transmits a command signal to the ECU 3. Based on the received command signal, the ECU 3 starts control of bringing the changed property to the basic property of the vehicle Ve.

All of an integrated value of boarding hours, an integrated value of running distances, and the number of boardings are parameters serving as indices of the degree of habituation of the driver to the vehicle Ve. This brings a property changed for reducing uncomfortable feeling to the basic property of the vehicle Ve according to the driver getting used to the driving property or manipulation property of the vehicle Ve. As a result, regarding fuel consumption or the like, original performance of the vehicle Ve can be exerted further more. At this time, in a case where at least one of the above-described three parameters exceeds a corresponding predetermined threshold, the changed property may be brought close to the basic property. This can shift a state to a state where original performance of the vehicle Ve can be exhibited further more, considering habituation of the driver. In addition, considering a case where the driver gradually gets used to the vehicle Ve, the changed property may be gradually brought close to the basic property according to an increase in at least one of the above-described three parameters. Which of the above-described three parameters is to be used as an index is set according to a vehicle type or a body type of the vehicle Ve, for example. In addition, two or more of the three parameters may be used as indices, and control of bringing the changed property close to the basic property may be started in a case where all the parameters serving as indices exceed a threshold. In any case, when the changed property is brought close to the basic property, the property is preferably changed in such a way of approach in which the driver does not feel uncomfortable feeling in the change.

Figure 4:
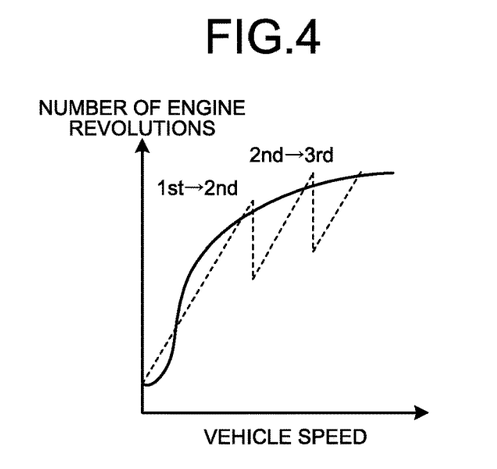
FIG. 4 is a graph illustrating an example of speed change properties of a previously-owned vehicle and a currently-owned vehicle.

Hereinafter, a more detailed description will be given with reference to a specific example. FIG. 4 is a graph illustrating an example of speed change properties, which is one of driving properties, of a previously-owned vehicle and the vehicle Ve being a currently-owned vehicle. Here, a solid line indicates a speed change property of the vehicle Ve, and a broken line indicates a speed change property of the previously-owned vehicle. The previously-owned vehicle is a vehicle equipped with a multistage transmission, and the number of engine revolutions increases in proportion to an increase in vehicle speed, but the number of engine revolutions declines once at the time of speed change (e.g., speed change from 1st to 2nd, speed change from 2nd to 3rd, etc.). On the other hand, the vehicle Ve is equipped with a Continuously Variable Transmission, and a basic speed change property thereof is such property that the number of engine revolutions increases so as to draw a smooth curved line with an increase in vehicle speed.

Figure 5A:
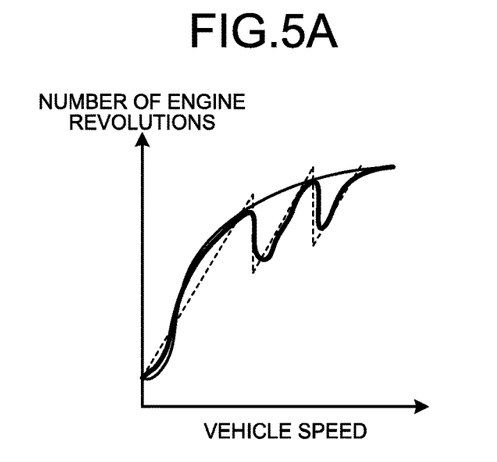
FIG. 5A is a graph illustrating an example of a state where a speed change property has been brought close to a property of the previously-owned vehicle.

In the vehicle Ve, based on an instruction signal transmitted from the in-vehicle information communication device 140, the ECU 3 changes the speed change property of the vehicle Ve from the basic speed change property to a speed change property indicated by a thick solid line in FIG. 5A. The speed change property is a property that reflects the feature information and is brought close to the speed change property of the previously-owned vehicle. This reduces uncomfortable feeling of the driver that is felt in speed change.

Figure 5B:
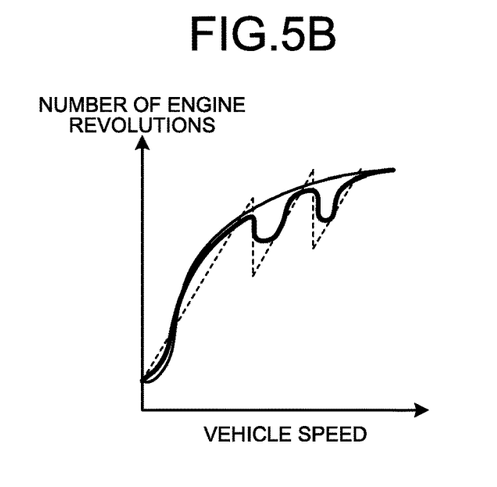
FIG. 5B is a graph illustrating an example state of bringing a speed change property close to a basic property of the currently-owned vehicle.

Subsequently, for example, if a parameter serving as an index exceeds a threshold, the ECU 3 brings the changed speed change property close to the basic speed change property of the vehicle Ve that is indicated by a thick solid line in FIG. 5B. After that, the ECU 3 fully returns the speed change property to the basic speed change property of the vehicle Ve. Nevertheless, the speed change property may be returned to a predetermined speed change property close to the basic speed change property. This shifts a state to a state where original performance of the vehicle Ve can be exhibited further more, when the driver is getting used to the vehicle Ve. In particular, bringing a driving property such as a speed change property close to the basic property of the vehicle Ve is effective for suppressing deterioration in fuel consumption.

The above description has been given of a speed change property, which is one of driving properties, as an example, but a property to be changed from a basic property and then brought close to the basic property is not limited to a driving property such as a speed change property. For example, any of reaction forces generated in the shift lever 4, the accelerator pedal 6, the brake pedal 8, and the steering wheel 14, which is one of manipulation properties, may be changed from a basic property, and then brought close to the basic property. Because these manipulators largely affect driving manipulation feeling of the driver, first of all, changing a property from a basic property and reducing uncomfortable feeling, and then, bringing the property close to the basic property so that original performance can be exhibited further more is effective.

Other Operation Examples of in-Vehicle Information Communication Device 140 and ECU 3

Next, other operation examples of the in-vehicle information communication device 140 and the ECU 3 will be described. The operation is performed after control of changing the basic property of the vehicle Ve, and after that, bringing the changed property to the basic property has been ended. The in-vehicle information communication device 140 appropriately acquires information of the predictively-owned vehicle from the management server 110 or the information communication device 150. In the in-vehicle information communication device 140, the processing unit 141 performs arithmetic processing based on the acquired information and generates a command signal, and the generated command signal is transmitted to the ECU 3. Based on the received command signal, the ECU 3 changes at least one property included in driving properties or manipulation properties in the vehicle Ve. Specifically, the ECU 3 performs control of bringing at least one property included in driving properties or manipulation properties of the vehicle Ve, from the basic property of the vehicle Ve close to a basic property of a predictively-owned vehicle.

Figure 6A:
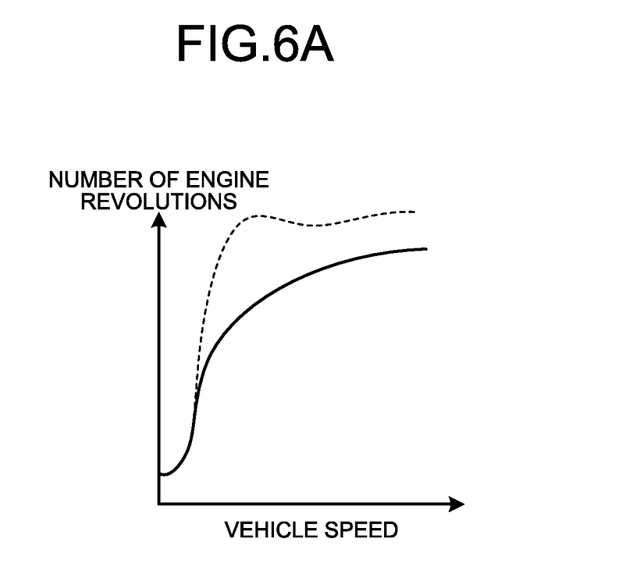
FIG. 6A is a graph illustrating an example of a state of bringing a speed change property from a basic property of the currently-owned vehicle to a property of a predictively-owned vehicle.
Figure 6B:
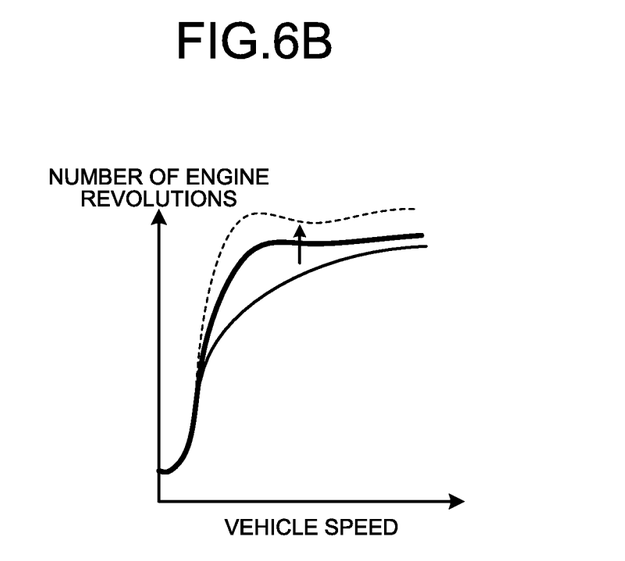
FIG. 6B is another graph illustrating the example of the state of bringing the speed change property from the basic property of the currently-owned vehicle to the property of the predictively-owned vehicle.

Hereinafter, a more detailed description will be given with reference to a specific example. FIG. 6A is a graph illustrating an example of speed change properties, which is one of driving properties, of the vehicle Ve and a predictively-owned vehicle. Here, a solid line indicates a speed change property of the vehicle Ve, and a broken line indicates a speed change property of the predictively-owned vehicle. The speed change property of the predictively-boarded vehicle is a property having a better rising of the number of engine revolutions at low vehicle speed as compared with the speed change property of the vehicle Ve.

In the vehicle Ve, based on an instruction signal transmitted from the in-vehicle information communication device 140, the ECU 3 changes a speed change property of the vehicle Ve from the basic speed change property to a property brought close to the basic speed change property of the predictively-owned vehicle, specifically, a speed change property indicated by a thick solid line in FIG. 6A, and changes the speed change property so as to be further close to the basic speed change property of the predictively-owned vehicle according to the setting. By changing the speed change property of the vehicle Ve to a property brought close to the basic speed change property of the predictively-owned vehicle in this manner, uncomfortable feeling felt when the driver actually changes to the predictively-owned vehicle after that can be suppressed. Nevertheless, it is preferable that the degree of the change be such a degree that the driver does not feel uncomfortable feeling in the driving of the vehicle Ve.

The above description has been given using a speed change property, which is one of driving properties, as an example, but any of reaction forces generated in the shift lever 4, the accelerator pedal 6, the brake pedal 8, and the steering wheel 14, which is one of manipulation properties, may be brought close to the basic property of the predictively-owned vehicle.

In addition, the ECU 3 may perform control of bringing at least one property included in driving properties or manipulation properties of the vehicle Ve, from the basic property of the vehicle Ve to a basic property of not a predictively-boarded vehicle but a set vehicle which is set in advance. For example, because the vehicle Ve is a hybrid vehicle, a plug-in hybrid vehicle with higher a motorized rate, an electrical vehicle, or a fuel-cell vehicle may be regarded as the set vehicle.

The above description has been given by assuming that the previously-owned vehicle is an example of a previously-boarded vehicle, but the previously-boarded vehicle is not limited to this, and is not specifically limited as long as the previously-boarded vehicle is a vehicle that the driver has ever boarded in the past such as a vehicle rented or shared. In addition, the predictively-owned vehicle has been described as an example of the predictively-boarded vehicle, but the predictively-boarded vehicle is not limited to this, the predictively-boarded vehicle is not specifically limited as long as the predictively-boarded vehicle is a vehicle predicted to be boarded, such as a vehicle planned to be rented or shared. Information of the vehicle planned to be rented or shared is stored in the information DB 132 of the car rental/car sharing agency server 130, acquired by the management server 110, and stored into the information DB 113.

In addition, in a group such as a family including a driver, or a company organization to which the driver belongs, in a case where a plurality of vehicle having different vehicle types or the like are owned, all vehicles can be a vehicle having a property to be changed, a previously-boarded vehicle, or a predictively-boarded vehicle. In this case, for a specific driver, a vehicle driven by the driver most frequently is set as a previously-boarded vehicle, and when the driver drives another vehicle, it is preferable that a property thereof be brought close to a property of the vehicle driven most frequently, and then, brought close to the basic property of the other vehicle. As the vehicle driven by the driver most frequently, a vehicle with the largest integrated value of driver hours, the largest integrated value of running distances, or the largest number of driver times, for example, is selected. These pieces of information are stored in the information DB 113 of the management server 110 in association with a user account of the driver.

Here, the vehicle control apparatus of the present disclosure can be applied to an automatically-driven vehicle. The level of automatic driving depends on the definition of J3016 (September, 2016) of Society of Automotive Engineers (SAE) international, for example. In a high-level automatically-driven vehicle, when there exists a plurality of occupants, a driver and other occupants are not clearly distinguished in some cases. In addition, also in a case where a plurality of information communication devices 150 exists in an occupant compartment, a driver fails to be determined in some cases. In this case, the vehicle control apparatus can execute control of determining which occupant is a driver. In addition, in high-level automatic driving, in a case where a driving manipulation is not performed, among occupants, an occupant that reflects feature information indicating a feature regarding vehicle driving in changing a certain property can be regarded as the driver.

For example, the in-vehicle information communication device 140 may recognize a face of an occupant seated on a driver seat, from an image or a video of the inside of a vehicle compartment that has been imaged by the imaging device 170, verify prestored face authentication information and the user account of the information communication device 150, and determine the driver.

Figure 7:
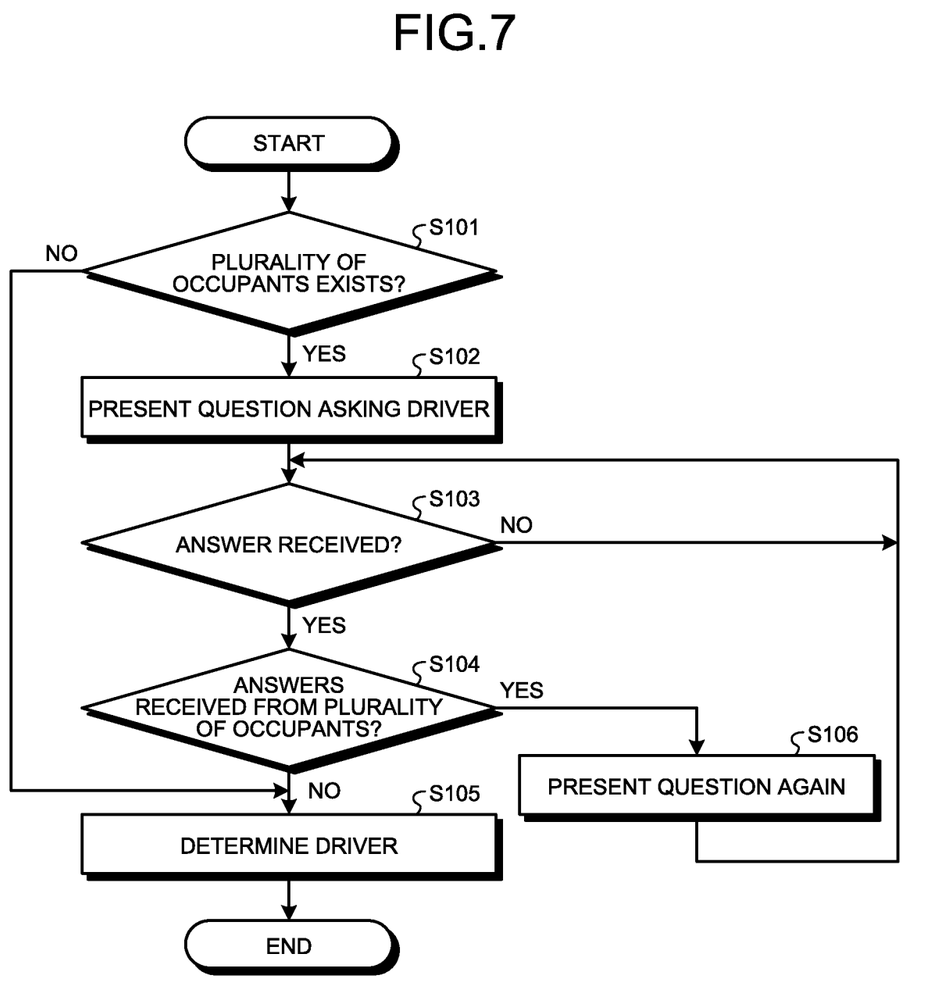
FIG. 7 is a flowchart illustrating an example of control of determining a driver.

Alternatively, a driver may be identified in the following manner. FIG. 7 is a flowchart illustrating an example of control of confirming a driver that is performed by the in-vehicle information communication device 140. First, in Step S101, the in-vehicle information communication device 140 determines whether a plurality of occupants exists. Whether a plurality of occupants exists is determined based on an image or a video of the inside of a vehicle compartment that has been imaged by the imaging device 170, determined by sensors provided on seats in an occupant compartment or determined by checking whether a plurality of information communication devices 150 exists in the occupant compartment by communication. In a case where it is determined that a plurality of occupants does not exist (NO in Step S101), the process ends.

In a case where a plurality of occupants exists (YES in Step S101), the process proceeds to Step S102, in which a question asking a driver is presented. The question is asked by voice output in the user interface unit 145, character display on a display equipped with a touch panel function or the like. The occupant can answer that he himself/her herself is a driver by voice or a manipulation of a touch panel. In addition, the occupant may answer by performing a gesture such as showing a hand to the imaging device 170. An occupant that has performed the gesture can be determined by verifying face authentication information and the user account of the information communication device 150.

Subsequently, in Step S103, the in-vehicle information communication device 140 determines whether an answer has been received. In a case where it is determined that an answer has not been received (NO in Step S103), Step S103 is repeated. In a case where it is determined that an answer has been received (YES in Step S103), the process proceeds to Step S104, in which it is determined whether answers have been received from a plurality of occupants. In a case where it is determined that answers have not been received from a plurality of occupants (NO in Step S104), the process proceeds Step S105, in which a driver is determined, and the process ends.

In a case where it is determined that answers have been received from a plurality of occupants (YES in Step S104), the process proceeds to Step S106, in which a question is presented again. The question presented again may be a question for further identifying a driver from the plurality of occupants that have answered, or may be a question for identifying a driver from the other occupants that have not answered, for example. After that, the control returns to Step S103. Through such a control flow, a driver is confirmed.

Figure 8:
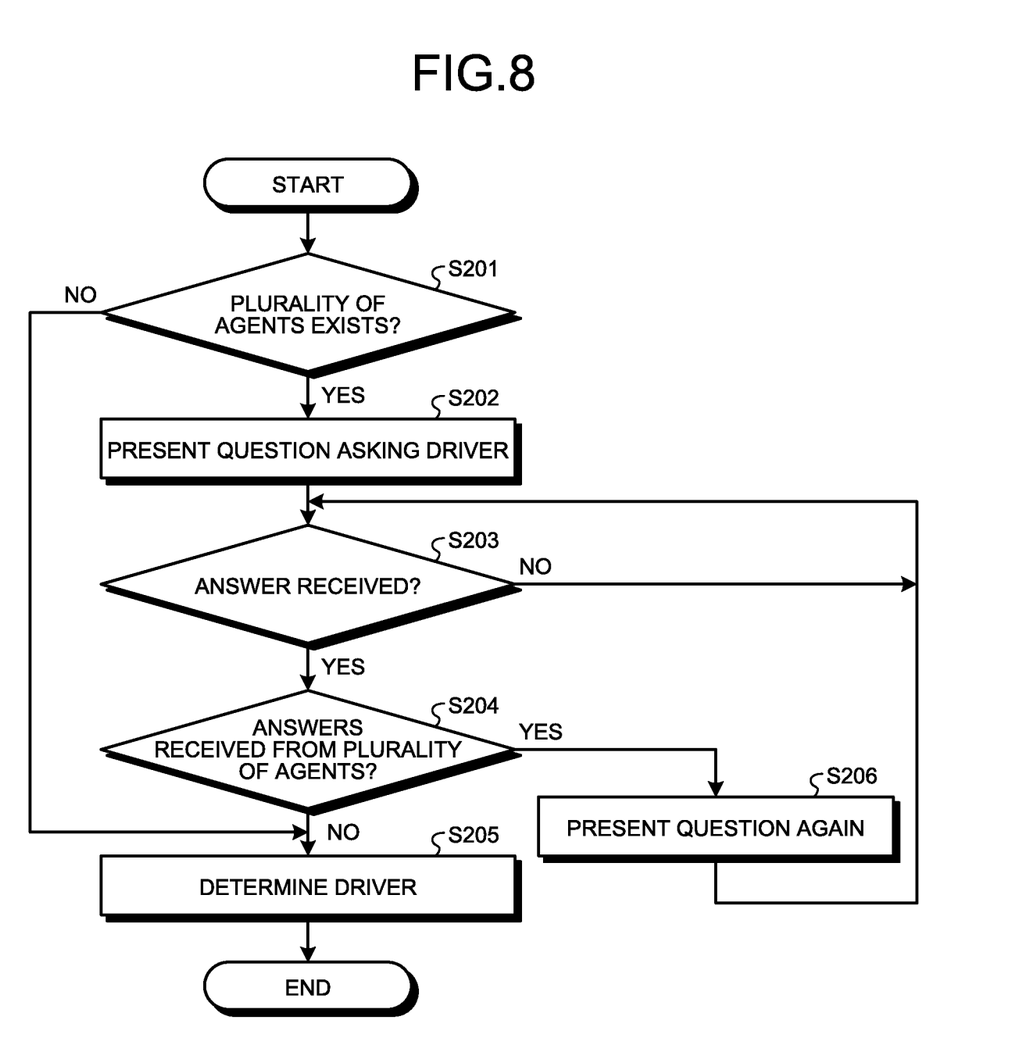
FIG. 8 is a flowchart illustrating another example of control of determining a driver.

FIG. 8 is a flowchart illustrating another example of control of determining a driver that is performed by the in-vehicle information communication device 140. First, in Step S201, the in-vehicle information communication device 140 determines, from results of communication performed with a plurality of information communication devices 150, whether a plurality of agents (here, information communication devices 150) exists. In a case where it is determined that a plurality of agents does not exist (NO in Step S201), the process ends.

In a case where a plurality of agents exists (YES in Step S201), the process proceeds to Step S202, in which a question asking a driver is presented. The question is performed by voice output in the user interface unit 145, character display on a display equipped with a touch panel function or the like. In this case, the occupant can answer that he himself/her herself is a driver, by voice, a manipulation of a touch panel, or a gesture. In addition, the occupant may answer by manipulating the information communication device 150 of himself/herself.

Subsequently, in Step S203, the in-vehicle information communication device 140 determines whether an answer has been received. In a case where it is determined that an answer has not been received (NO in Step S203), Step S203 is repeated. In a case where it is determined that an answer has been received (YES in Step S203), the process proceeds to Step S204, in which it is determined whether answers have been received from a plurality of agents. In a case where it is determined that answers have not been received from a plurality of agents (NO in Step S204), the process proceeds to Step S205, in which a driver is determined, and the process ends.

In a case where it is determined that answers have been received from a plurality of agents (YES in Step S204), the process proceeds to Step S206, in which a question is presented again. The question presented again may be a question for further identifying a driver from the plurality of occupants that have answered, or may be a question for identifying a driver from the other occupants that have not answered, for example. After that, the control returns to Step S203. Through such a control flow, a driver is confirmed.

In addition, in the above description, the in-vehicle information communication device 140 acquires feature information indicating a feature regarding vehicle driving from the management server 110 or the like, but the in-vehicle information communication device 140 may acquire the feature information by an information input from an occupant such as a driver. For example, the feature information may be acquired by displaying several options on a display equipped with a touch panel, and obtaining an answer by voice, a manipulation of the touch panel, or a gesture.

For example, the in-vehicle information communication device 140 displays, on a display equipped with a touch panel, questions such as "1) do you want to continuously turn on an accelerator immediately before a curve, and then, decelerate using a brake?", "2) do you want to turn off an accelerator before a curve and gradually decelerate?", or "3) Whichever is fine?", when deceleration is performed at a curve. By an occupant making an answer after selecting any one of 1) to 3), the in-vehicle information communication device 140 can acquire information.

The present disclosure causes such an effect that uncomfortable feeling felt in a case where there is a change in vehicle can be reduced, and original performance of a vehicle can be exerted further more.

According to an embodiment, it becomes possible to shift a state to a state where original performance of the vehicle can be exhibited further more, considering practice experience of an occupant.

According to an embodiment, a property is changed to a property accustomed to by an occupant to some extent, and accordingly, a reduction in uncomfortable feeling of the occupant can be efficiently implemented.

According to an embodiment, a property is changed to a property further accustomed to by an occupant, and accordingly, a reduction in uncomfortable feeling of the occupant can be implemented more efficiently.

According to an embodiment, it becomes possible to reduce uncomfortable feeling felt when the occupant boards a set vehicle that is predicted to be boarded or is preset.

According to an embodiment, it becomes possible to reduce uncomfortable feeling felt when the occupant boards a vehicle corresponding to the interest.

According to an embodiment, it becomes possible to reduce uncomfortable feeling felt when the occupant boards a vehicle with a high motorized degree.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle control apparatus comprising:
    an information acquisition unit configured to acquire feature information indicating a feature regarding vehicle driving of an occupant of a vehicle; and
    a control unit configured to change at least one property included in a driving property or a manipulation property in the vehicle,
    wherein the control unit is configured to:
    change at least one property included in the driving property or the manipulation property of the vehicle, from a basic property of the vehicle to a property reflecting the feature information to a changed property, based on the feature information, and
    further change the changed property to be closer to the basic property of the vehicle than the changed property is to the basic property of the vehicle in accordance with at least one of an integrated value of boarding hours, an integrated value of running distances, and the number of boardings of the vehicle of the occupant.

2. The vehicle control apparatus according to claim 1, wherein
    the control unit is configured to start control of bringing the changed property close to the basic property of the vehicle in a case where at least one of the integrated value of the boarding hours, the integrated value of the running distances, and the number of boardings exceeds a corresponding predetermined threshold.

3. The vehicle control apparatus according to claim 1, wherein
    the control unit is configured to change at least one property included in the driving property or the manipulation property of the vehicle to a property that reflects the feature information and that is brought close to a corresponding property in a specific previously-boarded vehicle in which the occupant has ever ridden before a boarding time point of the vehicle.

4. The vehicle control apparatus according to claim 3, wherein
    a vehicle with a largest integrated value of boarding hours of the occupant, a largest integrated value of running distances, or the largest number of boardings is selected as the specific previously-boarded vehicle.

5. The vehicle control apparatus according to claim 1, wherein the information acquisition unit is configured to acquire information indicating a predictively-boarded vehicle that the occupant is predicted to board after getting off the vehicle, or a set vehicle which is preset for the occupant, and
    based on the information indicating the predictively-boarded vehicle or the set vehicle, the control unit is configured to bring at least one property included in the driving property or the manipulation property of the vehicle, from the basic property of the vehicle or a property having been brought close to the basic property of the vehicle, to a basic property of the predictively-boarded vehicle or the set vehicle.

6. The vehicle control apparatus according to claim 5, wherein
the predictively-boarded vehicle is predicted based on information of a vehicle in which the occupant is interested.

7. The vehicle control apparatus according to claim 5, wherein
the set vehicle has a motorized degree that is higher than the vehicle.

* * * * *